United States Patent [19]

Confer

[11] 4,358,789

[45] Nov. 9, 1982

[54] DIGITAL SCAN CONVERTER FOR IMAGE SCANNING AND DISPLAY SYSTEM

[75] Inventor: Charles L. Confer, Arlington, Mass.

[73] Assignee: Inframetrics, Inc., Bedford, Mass.

[21] Appl. No.: 269,426

[22] Filed: Jun. 1, 1981

[51] Int. Cl.³ .............................................. H04N 5/02
[52] U.S. Cl. .................................. 358/140; 358/208; 343/55 C
[58] Field of Search ............... 358/140, 285, 199, 206, 358/208; 343/55 C, 8 DP, 6 TY, 6 ND

[56] References Cited

U.S. PATENT DOCUMENTS

| | | | |
|---|---|---|---|
| 3,810,174 | 5/1974 | Heard et al. | 343/5 PB |
| 3,978,281 | 8/1976 | Burrer | 358/113 |
| 4,037,231 | 7/1977 | Broyles et al. | 358/293 |
| 4,065,770 | 12/1977 | Berry | 343/5 SC |
| 4,149,252 | 4/1979 | Miller, Jr. | 364/456 |
| 4,214,269 | 7/1980 | Parker et al. | 358/140 |

Primary Examiner—Robert L. Griffin
Assistant Examiner—Edward L. Coles, Sr.
Attorney, Agent, or Firm—Cesari and McKenna

[57] ABSTRACT

A scan converter circuit for use in a imaging system that uses a sinusoidally oscillating scanning reflector for scanning an object and a constant rate scanned display monitor for displaying an image of the object. The circuit enables a variable time rate of sampling of picture elements in the object field to match a desired constant display rate of picture elements in the CRT display monitor. The circuit comprises a constant rate VCO clock and a sampling clock that produces periodically variable rate pulses, the periodicity of which being phase locked with zero crossings of the oscillating reflector and wherein the pulses are derived from the constant rate VCO clock. The sampling clock enables an image sensor to sample the radiance levels at a rate which varies with the sinusoidal sweep speed of the oscillating reflector. The circuit further includes a memory circuit for buffering and reversing the order of picture element information during at least one sweep direction, and a transfer control circuit for alternately supplying to the CRT display monitor picture element representations from the sensor and the temporary memory so that picture elements obtained during a right-to-left sweep and a succeeding left-to-right sweep are accurately aligned with each other and bear a one-to-one correspondence with picture elements in the image field.

12 Claims, 10 Drawing Figures

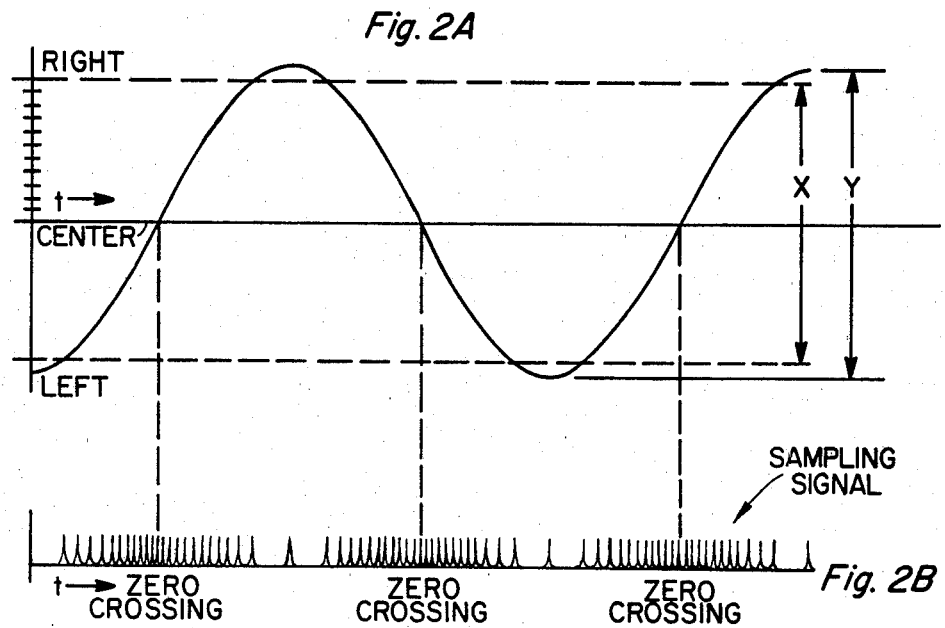
Fig. 2A
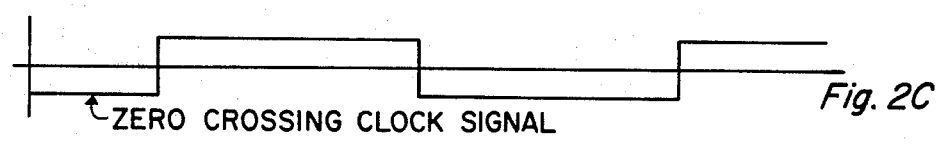
Fig. 2B
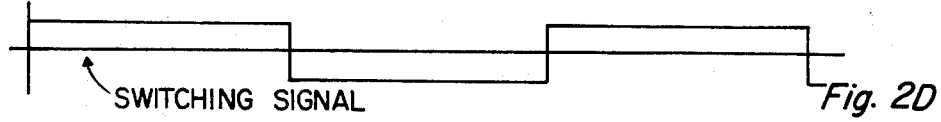
Fig. 2C
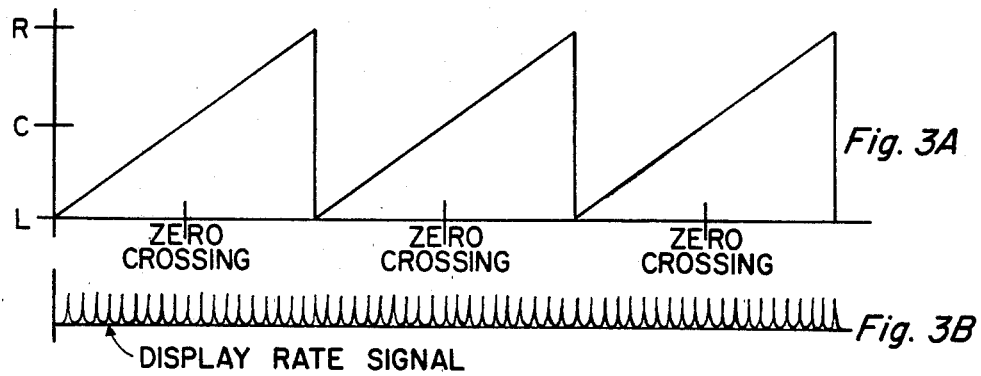
Fig. 2D
Fig. 3A
Fig. 3B

DIGITAL SCAN CONVERTER FOR IMAGE SCANNING AND DISPLAY SYSTEM

CROSS-REFERENCES TO RELATED PATENTS AND APPLICATIONS

This invention is related to commonly assigned and incorporated:

U.S. Pat. No. 3,978,281 titled INFRARED IMAGING SYSTEM issued Aug. 31, 1976; and U.S. patent application Ser. No. 06/200,571 filed Oct. 24, 1980 titled SCANNING MIRROR ARRANGEMENT.

BACKGROUND OF THE INVENTION

This invention pertains to imaging systems that employ opto-mechanical scanning reflectors for scanning an object and information processing circuitry for displaying an image of the object on a conventional television monitor. More specifically, the invention concerns a scan converter circuit for processing picture element information derived from sinusoidally oscillating reflectors so as to display on the television monitor an undistorted image of an object.

Imaging systems are used for producing an image representation of an object. To produce the image, the object is generally scanned by an opto-mechanical scanner. The scanner directs radiant energy from the object to a radiant energy sensor. A focusing lens also is usually placed in the optical path between the object and the sensor. The image is displayed on a display device, such as a CRT monitor. The radiance information obtained at the sensor is processed by an electrical circuit in a fashion so that it is compatible with the display circuitry of a display device. Scanners of this type are well known.

Difficulty often arises during assembly of the radiance information obtained from the sensor for producing an image that precisely depicts the object. For precisely depicting an image of the object, efforts have previously been directed to choosing a scanning mechanism that renders information that can conveniently be displayed with minimal signal processing or to choosing a display device that can conveniently be adapted to the signals produced by the scanning mechanism with minimal signal processing circuitry. However, a preferred scanning technique, such as sinusoidal raster scanning, is not always compatible with a preferred display device, such as a conventional television monitor. When using the preferred scanning mechanism and display device, the effort is directed to the most efficient and economical scan conversion network.

An efficient scan converter system is described in commonly assigned U.S. Pat. No. 3,978,281. It includes circuitry for converting picture information obtained during bi-directional raster scanning of an object scene to picture information that can be displayed on a linear scan CRT display monitor. The circuit includes means for reversing the order of sampled picture elements obtained during at least one half of the sweep cycle of an oscillating reflector. It also includes electronic circuitry for varying the sample rate of picture information in the object scene so that the picture elements can be displayed in real time by a conventional linear scanned television monitor.

A system directed to the problem of controlling the display rate of previously stored picture elements by a sinusoidally oscillating reflector is described in U.S. Pat. No. 4,037,231. This system projects onto a rotating drum medium stored picture elements during the linear portion (43%) of the position of a horizontal scan reflector. The picture elements are obtained from a buffer which receives its data from a memory device. During the remaining non-linear scan portion of the reflector, the buffer is again loaded with data from the memory device.

One objective of this invention though is to utilize as much of the horizontal scan portion of a sinusoidally oscillating reflector as possible without image distortion and thereby improve the overall scanning efficiency of image forming scanning systems.

Another objective of the invention is to improve the image quality in scanning systems using raster scanning mechanisms for scanning an object and a CRT display device for displaying an image of the object.

Another objective of the invention is to provide a common high "Q" synchronizing apparatus for timing the operation of the sampling and display control circuits.

Other objectives will become more readily apparent upon review of the succeeding disclosure.

SUMMARY OF THE INVENTION

Generally, the invention is a scan converter circuit for use in and for improving the performance of an opto-mechanical scanning system using a pair of oscillating scanning reflectors disposed upon orthogonal axes, the horizontal reflector of which being driven in a sinusoidal fashion to scan both in a left-to-right sweep path and in a right-to-left sweep path. It particularly concerns compensating for differences between the scanning motion of the horizontal reflector in the opto-mechanical scanning reflector and the horizontal sweep motion of an electron beam in a CRT display device. The scan converter circuit essentially transforms sinusoidally rate sampled picture elements in the object field being scanned so that these picture elements can be displayed in a conventional unidirectionally constant rate scanned television monitor with minimal distortion in the image. The distortion to which I refer results from previous difficulties in maintaining a one-to-one correspondence between the positions of picture elements in the object field vis-a-vis the position of picture elements in the image field.

Accordingly, the invention improves the scanning performance of a scanning system that comprises an oscillating reflector arrangement for scanning an object field in a raster fashion, a sensor positioned in the optical path of the scanning arrangement for detecting radiance levels of the picture elements in an image field derived from the object scene, and a CRT display monitor for receiving picture element representations of the radiance levels from the sensor. As the scanning rate is sinusoidally performed by the reflector arrangement and linearly performed in the display monitor, the inventive converter circuit for improving the scanning performance thus comprises a constant rate clock, a sampling clock having its pulses derived from the constant rate clock for enabling the sensor to sample the radiance levels at a periodically varying rate which varies with the sinusoidal sweep speed of the oscillating reflector wherein the periodicity is phase locked with the occurrences of zero crossings of the oscillating reflector, a memory circuit for buffering and reversing the order of picture element information during at least one sweep direction, and a transfer control circuit for alternately supplying to the CRT display monitor picture element representations from the sensor and the temporary memory so that picture elements obtained during a right-to-left sweep and a suceeding left-to-right sweep are accurately aligned with each other and bear a one-to-one correspondence with picture elements in the image field.

The sampling clock, in my preferred embodiment, comprises a digital frequency synthesizer that includes a voltage controlled oscillator (VCO), a phase lock circuit for keeping the VCO in phase with zero crossing indications from the zero crossing detector, and a divide-by-N counter that generates a sampling signal for enabling the sampling picture elements in the image field at a sinusoidally varying rate so as to provide equidistant spacing between the sampled picture elements. "N" varies during different portions of the sweep position of the oscillating reflector thereby to closely approximate the required sinusoidal sampling rate of the sensor during a plurality of time segments during each cycle of the oscillating reflector. The inventive converter circuit also includes a synchronization signal generator derived from a sub-multiple of the constant rate clock frequency thereby to assure phase coherence between the line scans in the reflector arrangement and the display monitor. Representations of the picture elements are supplied to the brightness modulation circuit of the television monitor in a fashion so that it matches the unidirectional linear horizontal sweeps of the electron beam.

The aforementioned scan converter circuit is used in and improves the performance of the infrared imaging system described in commonly assigned U.S. Pat. No. 3,978,281 incorporated herein.

The invention however is pointed out with particularity in the appended claims. These and other objectives, features, and advantages of the invention will become more readily apparent upon review of the succeeding disclosure taken in connection with the accompanying drawings.

DESCRIPTION OF DRAWINGS

FIG. 2A depicts a representation of the scan position of the oscillating horizontal scan reflector of FIG. 1.

FIG. 2B shows a sinusoidally varying sampling signal used for sampling picture elements in the scanned object.

FIG. 2C depicts a signal representation of the zero crossings of the horizontal scan reflector of FIG. 1.

FIG. 2D depicts a signal representation of the sweep reversals of the horizontal scan reflector of FIG. 1.

FIG. 3A depicts the linear scan position of an electron beam in the display device of FIG. 1.

FIG. 3B shows a constant rate display signal used for controlling the display of picture elements in the display device of FIG. 1.

DETAILED DESCRIPTION

Figure 1:
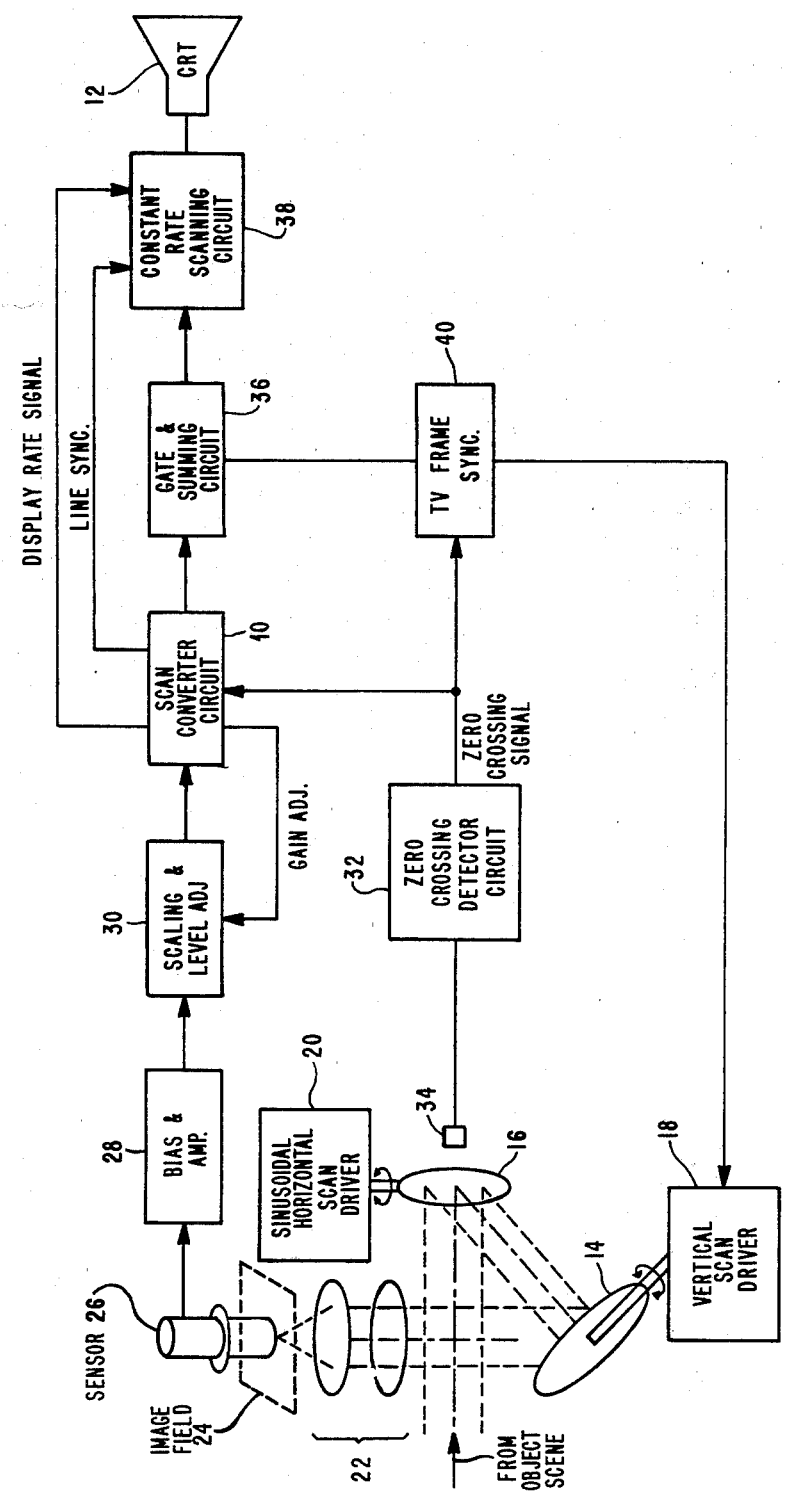
FIG. 1 shows an imaging system using a preferred raster scanning mechanism and display device.

FIG. 1 shows an imaging system that scans an object and displays an image of the object on a video monitor. The system includes the improved scan converter circuit 10 that makes compatible the time rate of sampling of picture element information obtained from the object scene with the time rate of display of those picture elements on a CRT display monitor 12.

In operation, the object scene is scanned in a raster fashion by a pair of oscillating vertical and horizontal scanning mirrors 14 and 16 which are respectively driven by torsional vibrators 18 and 20. Light rays, or bundles, from the object scene impinge upon the horizontal scan mirror 16 from a direction so that they are directed to the vertical scan mirror 14 at such an angle that the light rays pass through a lens assembly 22. The lens assembly focuses these light rays within an image field, generally depicted at 24. A sensor 26, being disposed in the image field 24, detects the radiance levels at various positions of the image field as it is swept across the sensor in a raster fashion. The sweeping of the image field is caused by the motion of the scanning mirrors 14 and 16. This technique is well known and is further described in the commonly assigned copending U.S. application Ser. No. 06/200,571.

The sensor 26 produces an electrical sensor signal proportional to the radiance level and supplies it to a bias generator and amplifier circuit 28. The circuit 28 amplifies and removes the noise content of the sensor signal in a conventional manner. Thereafter, the amplified sensor signal is supplied to a scaling and level adjust network 30, described in our previous U.S. Pat. No. 3,978,281, which further conditions and supplies it to the scan converter circuit 10, which in part, constitutes this invention. Specifically, the scan converter circuit converts bi-directionally rate generated electrical representations of the picture elements obtained from the scanning arrangement and sensor into uni-directionally constant rate electrical representations of the picture elements.

The scan converter circuit 10 repetitively samples the picture elements with an analog-to-digital converter to produce a serial stream of digital values. The serial stream is then framed (i.e. demarcated) to produce successive line scan information which is displayed on the CRT monitor 12. Proper framing of the serially obtained samples is necessary to acquire an undistorted image. Improper framing manifests itself in the monitor 12 by displaying a "serrated" image vertical line in the object field.

The scan converter circuit 10 adjusts the sampling rate of the sensor 26 so that the picture elements in the object field are sampled at equidistant locations along the path of scan provided by the horizontal scan mirror 16. To maintain equidistant scan locations, it is necessary that the scan sampling rate be adjusted in a manner that is proportional to the speed of scan of the mirror 16. It also reverses the order of the sampled picture elements obtained at the sensor during one direction of the bi-directional sweep of the reflector 16 so that they can be displayed in a unidirectionally sweeping CRT display monitor 12. In order to make this transformation, the scan converter circuit 10 uses a zero crossing signal from a zero crossing detector circuit 32. In accordance with another feature of this invention, the circuit 32 detects the center position of oscillation of the horizontal scan mirror 16 with the aid of an opto-mechanical transducer 34. Prior art systems have used capacitive coupling circuits or flexible strain gauges for producing an electrical sinusoidally varying waveform that is proportional to the position oscillating reflector. This waveform was then used as a reference from which to generate sampling pulses for the sensor. Because this waveform would often be distorted due to an imbalanced magnitude of the waveform signal between the left and right positions of the oscillating reflector, picture elements could not be sampled very accurately. Therefore, the image of the object is distorted. The opto-mechanical transducer 34, on the other hand, enables a very accurate production of a zero crossing signal. Further, instead of using a waveform produced by the transducer 34 as a reference against which the sampling is performed, I digitally approximate a sine waveform using the zero crossing signal from the transducer 34. This approach is not susceptible to waveform distortion, and therefore, the line synchronizing operations and the image are substantially improved. This circuit is subsequently described in greater detail.

After converting the picture element information, as aforestated, the converter 10 transfers this information to a gate and summing circuit 36 which then supplies it to a constant rate scanning circuit 38 under control of a TV frame sync circuit 40. The constant rate scanning circuit 38 receives a line sync signal and a display rate signal from the scan converter circuit 10. These signals enable the circuit 38 to display linearly the picture element information during successive line scans of the CRT monitor 12. The TV frame sync circuit 40 is driven by the zero crossing detector circuit 32, previously described, and generates two synchronizing control signals. A first control signal is supplied to the vertical scan driver 18 to synchronize its oscillations with a predetermined number of zero crossings, and a second control signal is supplied to the gate and summing circuit 36 to synchronize picture frames in the monitor 12 with a predetermined number of zero crossings of the reflector 16. Thus, it is seen that the reflector 16 is the common synchronizing control element is the scanning system. It is this common mechanical control element, among other things, that substantially improves the scan conversion operations in the imaging system.

As previously stated, the invention primarily concerns adapting the motion of the horizontal scan mirror 16 with the motion of an electron beam in the CRT monitor 12. The differences between these motions are depicted in FIGS. 2A and 3A, respectively. In FIG. 2A, it is seen that the position of the mirror 16 changes sinusoidally in time during its oscillation. It is also seen that the horizontal mirror scans both in a left-to-right direction and in a right-to-left direction during which the sensor 26 is enabled to sample picture element information. In FIG. 3A, it is seen that the position of the electron beam in the CRT monitor changes linearly with time. Further, the electron beam scans only in a left-to-right direction. Thus, to attain a one-to-one correspondence between the object and the image, the scan converter circuit is confronted with the problem of compensating for the scan speed differences and for compensating the differences due to different direction of scan, at least during a portion of the scan cycles. In order to attain this one-to-one correspondence, the scan converter circuit 10 generates a sensor sampling signal at a rate which varies according to the speed, or position, of the horizontal scan mirror 16. A conceptualization of such a signal is depicted in FIG. 2B. The sampling signal has a higher frequency near the zero crossings and a lower frequency near the extreme left and right positions of the reflector 16.

Not all positions of the reflector 16, however, are usable for sampling the object. At the extreme right or left position, the reflector 16 is momentarily stationary, and samples taken thereat would essentially reside in the same location in the object space. The scanning arrangement (described in U.S. Patent Application Ser. No. 06/200,571) in which I use this invention does, however, permit use of a substantial portion of the sweep range of the reflector 16. Assumming the "y" represents the total excursion of reflector 16, and that "x" represents the usable range of the excursion "y", in my preferred embodiments, x/y is 0.92 and 0.85, respectively.

FIG. 2C depicts a zero crossing clocking signal produced by the zero crossing detector 32. As will be subsequently explained, a phase shift circuit produces the switching signal shown in FIG. 2D which is shifted in phase by 90° with respect to the zero crossing clocking signal. The switching signal is used to control the reversals of the picture elements during one-half cycle of the oscillating reflector 16.

When the image is displayed in monitor 12, the scan converter circuit 10 supplies the picture elements thereto at a constant display rate signal, under control of a uniform display rate signal depicted in FIG. 3B.

Figure 4A:
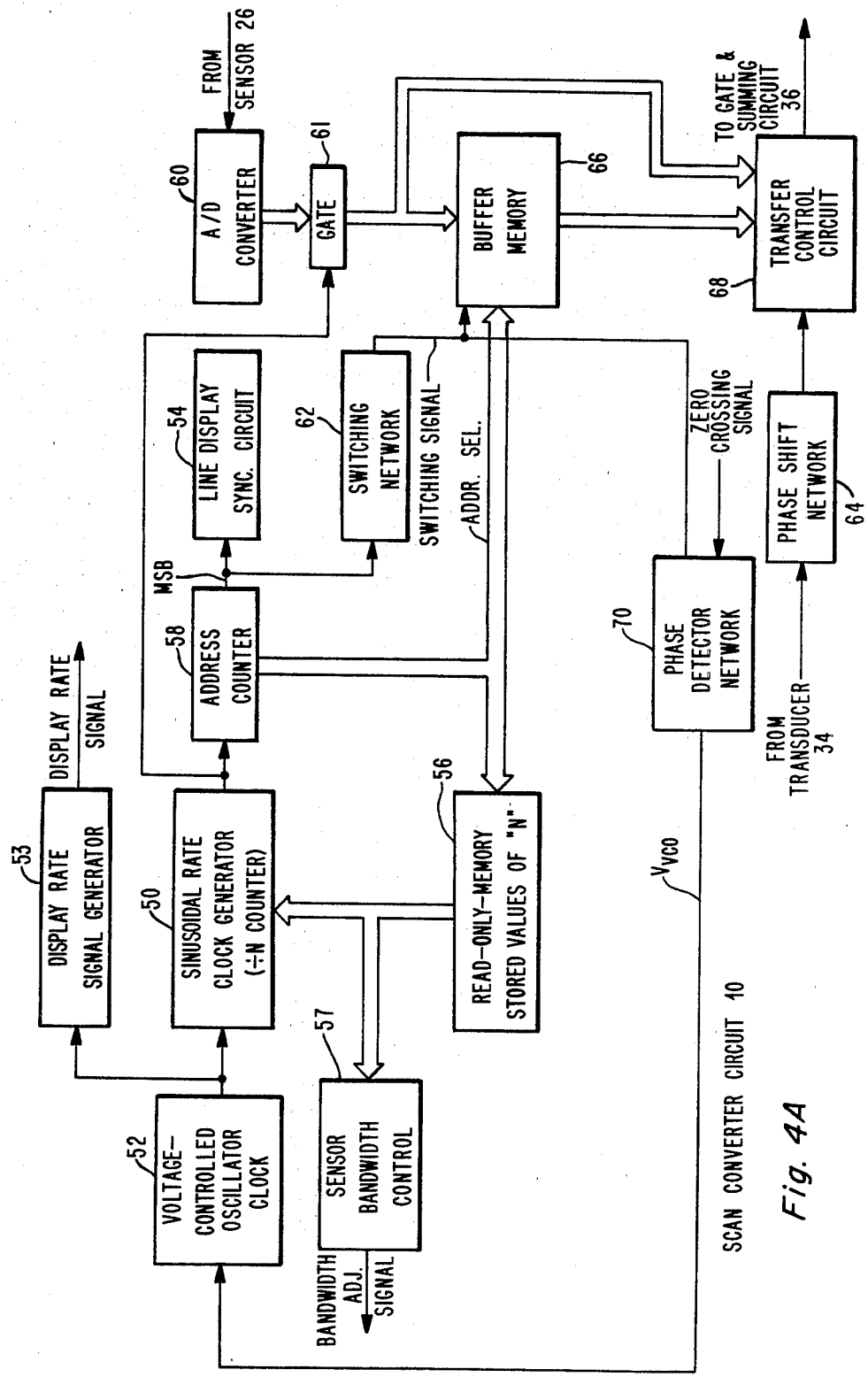
FIG. 4A depicts in greater detail the scan converter circuit of FIG. 1.

FIG. 4A shows in greater detail the components of the scan converter circuit 10. In the following description thereof, references are made to the control signal of FIGS. 2B, 2C, 2D, and 3B. The scan converter circuit 10 comprises a sinusoidal rate clock generator 50 which generates the sampling signal for controlling the sampling rate of the sensor 26. The clock generator 50 is a divide-by-N binary counter which receives clock pulses from an oscillator clock 52. The clock 52 is a voltage control oscillator. The frequency of oscillator clock 52 is controlled to produce clock pulses of a constant rate comparable to the display rate of picture elements on the CRT monitor 12 (FIG. 1) and in synchronism with the sweep cycles of the oscillating reflector 16 (FIG. 1). The oscillator 52 supplies its output to a display rate signal generator 53 which produces the display rate signal that is applied to the constant rate scanning circuit 38 (FIG. 1). The oscillator 52 also supplies its output pulses to the clock generator 50.

In order to produce the sinusoidally varying clock rate pulses for sampling picture elements at a sinusoidally varying rate, the clock generator 50 counts the pulses received from the oscillator 52 and divides the accumulated count by a digital variable $N_n$. N varies during a plurality of time intervals during the scan cycle of the horizontal scan mirror 16, and its values are obtained from a read-only-memory 56. The memory 56 supplies the digital values $N_n$ under control of address select signals from an address counter 58 that counts pulses produced by the most significant count bit of the clock generator 50. These are the sampling signal pulses, as previously stated. As the count in the address counter 58 reaches each of a plurality of predetermined count levels, i.e. address select signals, the read-only-memory 56, which receives these count levels, changes the value of $N_n$ that is supplied to the rate clock generator 50 thereby to change the frequency of the sampling signal produced thereby. The sampling signal count is representative of the position of the reflector 16.

Figure 4B:
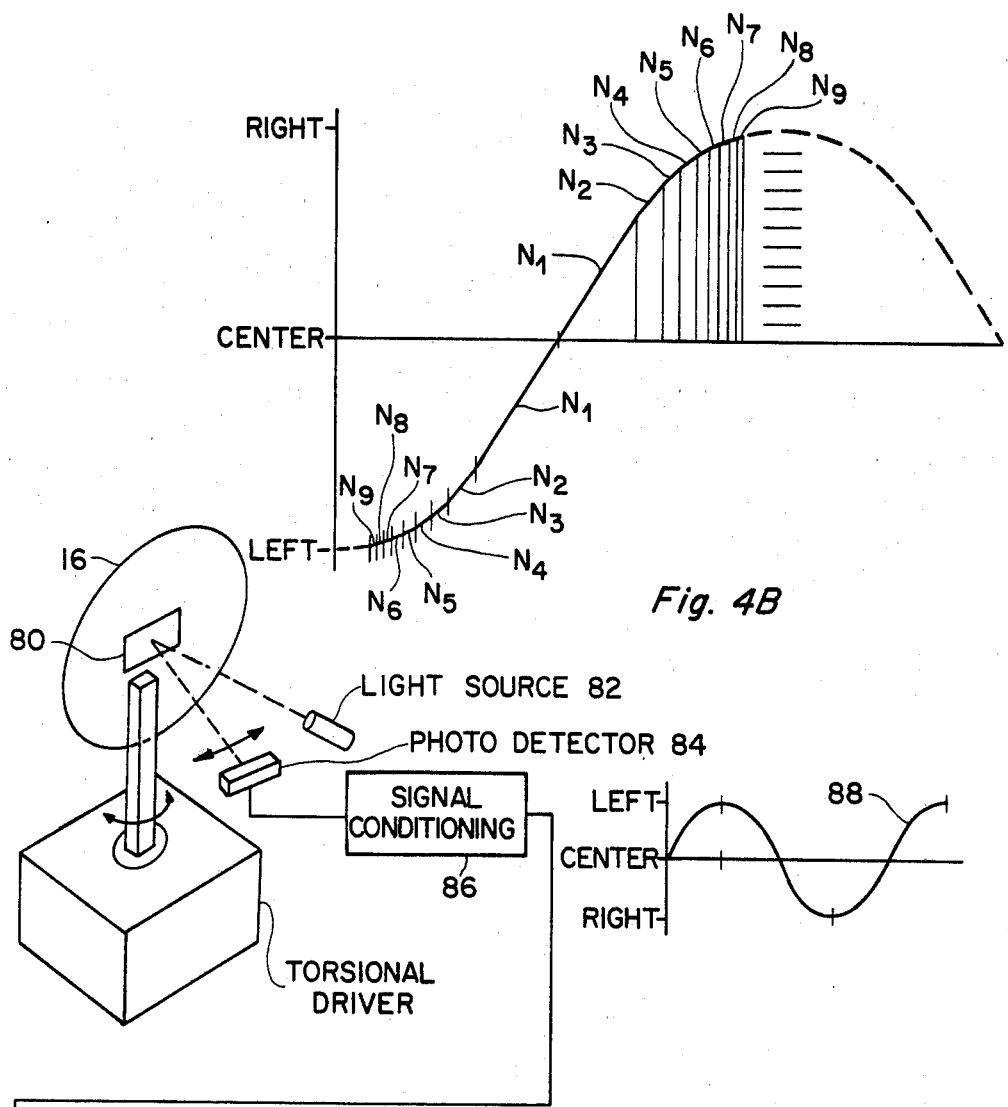
FIG. 4B shows a linear approximation of the sine wave motion of the horizontal reflector of FIG. 1 that characterizes the sampling signal depicted in FIG. 2C.

Referring to both FIGS. 4A and 4B and assuming negative going edges of the switching signal (FIG. 2D) represent the beginnings of left-to-right sweeps, the address counter 58 supplies a value $N_9$ during a first interval of the sweep to produce a relatively slow sampling rate, a slightly lower value $N_8$ during a second interval to produce a slightly higher sampling rate, and so on, until approaching the time interval contiguous to the zero crossing point. During this time interval, the address counter 58 supplies a lowest value $N_1$ to the clock generator 50 thereby to produce the highest sampling rate. Higher sampling rates are required near the zero crossing because the sweep velocity of the reflector 16 is the greatest at this point. Still during the left-to-right sweep of the reflector 16 and after passing the zero crossing point, the address counter 58 continues to supply the values $N_n$ to the clock generator 50, but this time, in reverse order. Likewise, during the right-to-left scan of the reflector 16, the application of $N_n$ to the divide-by-N clocking generator 50 is again repeated in the same order as above stated thereby to again sample picture elements on the reverse sweep. As known, the movement of reflector 14 causes sampling to access in a line vertically transposed from the previous line. As will become evident, this invention provides very accurate sampling so that picture elements obtained during the right-to-left scan are aligned with picture elements obtained during the left-to-right scan. These samples are taken only during the usable portion of the sweep cycle; that is during the excursion "x" of reflector 16 as indicated in FIG. 2A.

FIG. 4B shows the sine wave representation of the position of reflector 16 segmented into 18 linear segments for a single left-to-right sweep. Since the reflector 16 substantially oscillates in a perfect sinusoidal motion, its scan position relative to time is known with great precision. Therefore, by placing readily computable digital values $N_n$ in segmented time intervals corresponding to sinsusoidally varying scan position, the scan converter produces very accurately spaced sampling pulses. In some cases, though, the image produced by the scanning arrangement is distorted, not because of non-sinusoidal motion of the reflector 16, but because of lens aberations or other optical anomalies. According to another advantage of this invention, these optical distortions can be corrected by adjusting the values of N in one or more of the segments. Thus, in the case where an inexpensive lens or a wide-angle lens is used in the system in which optical distortion is induced, the image can be corrected by altering the value of N in the read-only-memory 56.

In any event, the sampling signal from the clock generator 50 is supplied to a gating circuit 61 to enable it to pass digital representations of the radiance levels of the sampled picture elements to a memory buffer 66. These digital representations are obtained from a conventional A/D converter circuit 60 which receives an analog input from the sensor 26.

The address counter 58, in addition to supplying select address signals to the read-only-memory 56 for selecting the values $N_n$ therein, also supplies address signals to the buffer memory 66. Thus, the outputs of address counter 58 simultaneously select the locations in the buffer memory that stores the digital picture element information and in the read-only-memory 56 that selects the digital values $N_n$. Since only the information of one-half sweep cycle of the reflector 16 need be stored in buffer memory 66, a switching network 62 disables the buffer memory 66 during one-half of its cycle. For example, if the buffer memory is enabled during positive assertions of the switching signal, it would store information obtained during the right-to-left sweep (FIG. 2A). The information stored in the buffer memory 66 is ultimately passed, on a last-in-first-out basis, to a transfer control circuit 68. During the other half cycle, the switching network 62 causes the sampled information to be passed directly to the transfer control circuit 68. The transfer control circuit 68 therefore passes the picture element information to the CRT display circuit in the proper sequence. The transfer control circuit 68 operates under control of the switching signal produced by a phase shift network 64. This switching signal is phased shifted 90° with respect to the zero crossing signal (FIG. 2C). Thus, it too is synchronized with zero crossings of the reflector 16 thereby to provide accurate framing of picture element information transferred to the display monitor 12.

When the address counter 58 counts a predetermined number of sampling signal pulses, i.e two hundred and fifty-six, it produces a MSB signal. The MSB signal is produced at each quarter-cycle of the reflector 16. The MSB signal drives a flip-flop in the switching network 62 thereby to produce the switching signal which is shown in FIG. 2D. This signal indicates the changes in sweep direction of the reflector 16. The switching signal and the zero crossing signal from the detector circuit 32 (FIG. 1) are both supplied to a phase detector network 70. This network 70 generates a reference control voltage $V_{vco}$ that is supplied to the voltage controlled oscillator clock 52 for controlling its frequency. The control voltage $V_{vco}$ is maintained at the proper reference level so long as the phase difference between the zero crossing signal and the switching signal is 90°. Any difference from this phase relationship alters the level of the reference control voltage $V_{vco}$ which thereby alters the frequency of the oscillator clock 52 in a manner to bring the signals back into the proper phase relationship. Thus, the frequency of the clock 52, and therefore the period of the address counter 58, is phase locked with the occurrences of zero crossings of the opto-mechanical reflector 16. Frequency control against the mechanical motion of the reflector 16 is particularly advantageous as it is very accurate.

The invention further includes a sensor bandwidth control circuit 57 that supplies a bandwidth adjust signal to the bias and amplifier circuit 28 (FIG. 1). The bandwidth adjust signal controls the bandwidth of the gain amplifier circuit of sensor 26 so that image contrast of brightness does not vary with the sweep position of the reflector 16 due to the varying scanning speed. As the read-only-memory 56 contains readily available information from which the the scanning position (and speed) can be approximated, the sensor bandwidth control circuit responds to the instantaneous stored values $N_n$ by producing a bandwidth control signal that is proportional thereto. An analog-to-digital converter, for example, might constitute part of the bandwidth control circuit 57. The analog voltage produced thereby can then be used to produce an inversely proportional bandwidth control voltage for the bias and amplifier circuit 28. Since greater amplifier bandwidths are required near the zero crossings, the lower values of $N_n$ thereat would render a higher gain control voltage.

Figure 5:
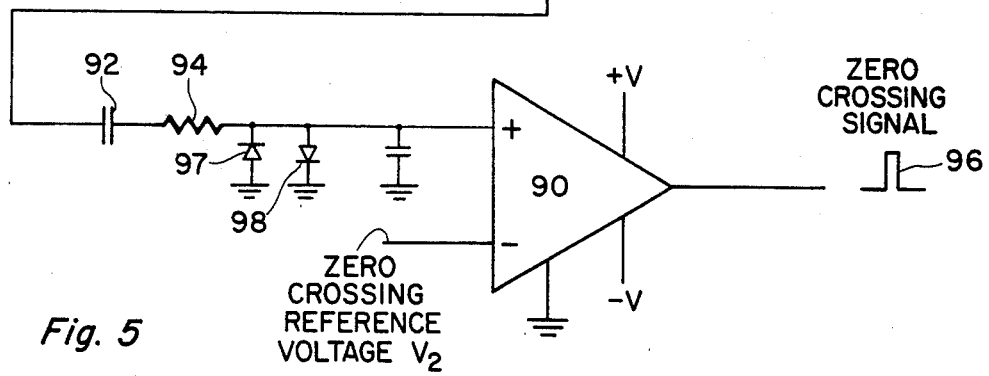
FIG. 5 depicts a transducer system for producing a signal representing the zero crossings of the horizontal scan reflector of FIG. 1.

FIG. 5 illustrates a preferred structure of the optical transducer 34 and the zero crossing detector 36 that are shown in FIG. 1. As seen therein, the scanning mirror 16 includes a reflector 80 on the backside thereof which receives light energy from a light source 82. The energy from the light source 82 is reflected from the mirror 80 to a photo detector 84 which supplies a signal to a signal conditioning network 86. In response to the energy received by the photo detector 84, the network 86 generates a sine wave output 88 that corresponds to the position of the scanning mirror 16. To detect the zero crossings (i.e. center position of oscillation) thereof, a comparator 90 receives at one input thereof the photo detector signal 88 through a capacitor 92 and resistor 94. The other input of the comparator 90 is tied to a zero crossing reference voltage $V_z$. When the signal from the photo detector circuit 86 matches the reference voltage $V_z$, the comparator 90 produces a zero crossing output pulse 96 which is supplied to the phase lock circuit 70 (FIG. 4A), and to the phase shift network 64 (FIG. 4A). The comparator 90 also includes a pair of clipping diodes 97 and 98 for regulating the voltage of the input signal to the comparator 90.

It is seen that the objects set forth above, among those made apparent from the preceding description, are efficiently attained, and since certain changes may be made from teachings herein by persons skilled in the art without departing from the scope of the invention, it is intended that all matter contained in the accompanying drawings and the specification be interpreted as illustrative and not in a limiting sense.

It is also to to understood that the following claims are intended to cover all of the generic and specific features of the invention herein described.

Accordingly, I claim:

1. In an imaging system for producing an image of an object wherein the imaging system includes:
    A. scanning means including at least one oscillating reflector positioned in an optical path between said object and an image field thereof for scanning the object along a bi-directional path at a sinusoidally varying speed,
    B. sensor means positioned in the image field derived from said object for measuring the radiance level of picture elements transferred thereto by said scanning means and for generating electrical representations of the picture elements, and
    C. display means having a constant rate scanned display monitor for receiving the electrical representations of the picture elements from said sensor means, an improved scan converter circuit for converting bi-directionally, sinusoidally rate generated representations of the picture elements into unidirectional, constant rate generated representations of the picture elements to be displayed in said display device, wherein the improvement comprises:
    A. constant rate clocking means for generating constant rate digital clocking signals coincident with the rate of display of picture elements displayed by said display device,
    B. sinusoidal rate clocking means for generating a sampling signal that enables said sensor means to produce electrical presentations of said picture elements at a substantially sinusoidally varying rate whereby said picture elements are sampled at equidistant positions along said path in each direction of said bi-directional sweep path, said sinusoidal rate clocking means being driven by said digital clocking signals from said constant rate clocking means,
    C. buffer means for temporarily storing said electrical representations of said picture elements during at least one of the bi-directional sweep directions of said oscillating reflector and for transmitting said stored representations in reverse order,
    D. zero crossing detector means for generating a zero crossing signal that indicates the zero crossings of said oscillating reflector about its center of oscillation,
    E. phase lock means for maintaining phase coherence between the periodic rate of change of said sampling signal from said sinusoidal rate clocking means and the occurrences of said zero crossing signal, and
    F. transfer means for alternately transferring said electrical representations of picture elements from said buffer means and said sensor means to said display device under control of said constant rate clocking means so that the positions of the picture elements of the object bear a one-to-one correspondence to the positions of picture elements displayed by said display means.

2. The improvement as recited in claim 1 further including:
    G. sensor gain control means connected to said sensor means for adjusting the bandwidth thereof in an amount proportional to the instantaneous rate of said sampling signal thereby to compensate for variations in the sampling rate of said sensor means due to speed variations of said oscillation reflector during its sweep cycle.

3. The improvement as recited in claim 1 further including:
    H. line synchronizing means responsive to a predetermined number of pulses from said constant rate clocking means for generating a line sync signal that is supplied to said display device for synchronizing line scans thereof with line scans of said oscillating reflector.

4. The improvement as recited in claim 1, 2, or 3 wherein said sinusoidal rate clocking means comprises:
    i. memory means for storing a set of values comprising a plurality of digital values of "N",
    ii. digital divider means that receives and divides by "N" the digital clocking signals from said constant rate clocking means thereby to produce said sampling signal upon each occurrence of "N" clocking signal pulses, and
    iii. address counter means for counting the number of sample signal pulses and for periodically supplying each stored value of "N" in said set of values during different time intervals of a cycle of said oscillating reflector.

5. The improvement as recited in claim 4 wherein said constant rate clocking means comprises a voltage controlled oscillator and said phase lock means comprises means to vary the control voltage of said voltage control oscillator so as to maintain phase coherence between the occurrences of said zero crossing signal and the periodic rate of change of said sampling signal.

6. The improvement as recited in claim 3 wherein said sinusoidal rate clocking means further includes:
    iv. stored value adjusting means for manually selecting different sets of values of "N" that are applied during the different time intervals thereby to correct optical distortions and other physical anomalies present in the imaging system.

7. A scan converter circuit for converting bi-directionally, sinusoidally rate generated electrical representations of picture elements produced by an oscillating scanning mechanism including sensor means and at least one bi-directional scanning reflector, said representations being converted into unidirectional, constant rate generated representations of picture elements to be displayed in a display device, said converter circuit comprising:

A. constant rate clocking means for generating constant rate digital clocking signals coincident with the rate of display of picture elements displayed by said display device, B. sinusoidal rate clocking means for generating a sampling signal that enables the sensor means to produce electrical presentations of said picture elements at a substantially sinusoidally varying rate whereby said picture elements are sampled at equidistant positions along said path in each direction of said bi-directional sweep path, said sinusoidal rate clocking means being driven by said digital clocking signals from said constant rate clocking means, C. buffer means for temporarily storing said electrical representations of said picture elements during at least one of the bi-directional sweep directions of said oscillating reflector and for transmitting said stored representations in reverse order, D. zero crossing detector means for generating a zero crossing signal that indicates the zero crossings of said oscillating reflector about its center of oscillation, E. phase lock means for maintaining phase coherence between the periodic rate of change of said sampling signal from said sinusoidal rate clocking means and the occurrences of said zero crossing signal, and F. transfer means for alternately transferring said electrical representations of picture elements from said buffer means and said sensor means to said display device under control of said constant rate clocking means so that the positions of the picture elements of the object bear a one-to-one correspondence to the positions of picture elements displayed by said display means.

8. The improvement as recited in claim 7 further including:

G. sensor gain control means connected to said sensor means for adjusting the bandwidth thereof in an amount proportional to the instantaneous rate of said sampling signal thereby to compensate for variations in the sampling rate of said sensor means due to speed variations of said oscillation reflector during its sweep cycle.

9. The improvement as recited in claim 7 further including:

H. line synchronizing means responsive to a predetermined number of pulses from said constant rate clocking means for generating a line sync signal that is supplied to said display device for synchronizing line scans thereof with line scans of said oscillating reflector.

10. The improvement as recited in claim 7, 8, or 9 wherein said sinusoidal rate clocking means comprises:

i. memory means for storing a set of values comprising a plurality of digital values of "N", ii. digital divider means that receives and divides by "N" the digital clocking signals from said constant rate clocking means thereby to produce said sampling signal upon each occurrence of "N" clocking signal pulses, and iii. address counter means for counting the number of sample signal pulses and for periodically supplying each stored value of "N" in said set of values during different time intervals of a cycle of said oscillating reflector.

11. The improvement as recited in claim 10 wherein said constant rate clocking means comprises a voltage controlled oscillator and said phase lock means comprises means to vary the control voltage of said voltage control oscillator so as to maintain phase coherence between the occurrences of said zero crossing signal and the periodic rate of change of said sampling signal.

12. The improvement as recited in claim 9 wherein said sinusoidal rate clocking means further includes:

iv. stored value adjusting means for manually selecting different sets of values of "N" that are applied during the different time intervals thereby to correct optical distortions and other physical anomalies present in the imaging system.

* * * * *